United States Patent [19]

Caprio et al.

[11] Patent Number: 5,664,362
[45] Date of Patent: Sep. 9, 1997

[54] FISHING LURE WHICH RELEASES THE INVOLUNTARY BITING REFLEX OF LARGEMOUTH BASS AND OTHER FISHES WITHIN THE FAMILY CENTRARCHIDAE

[75] Inventors: John T. Caprio; Kazuaki Ogawa, both of Baton Rouge, La.; Tine B. Valentincic, Ljubljana, Slovenia

[73] Assignee: The Board of Supervisors of Louisiana State University and Agricultural and Mechanical College, Baton Rouge, La.

[21] Appl. No.: 369,868

[22] Filed: Jan. 5, 1995

Related U.S. Application Data

[63] Continuation of Ser. No. 117,583, Sep. 3, 1993, abandoned.
[51] Int. Cl.⁶ ............................................. A01K 85/01
[52] U.S. Cl. ............................................... 43/42.06
[58] Field of Search ........................ 43/42.06, 4, 4.5

[56] References Cited

U.S. PATENT DOCUMENTS

| | | | |
|---|---|---|---|
| 4,530,179 | 7/1985 | Larew | 43/42.06 |
| 4,993,183 | 2/1991 | Carver | 43/42.06 |
| 5,201,138 | 4/1993 | Watkins | 43/42.06 |
| 5,344,918 | 9/1994 | Dazey | 530/381 |

FOREIGN PATENT DOCUMENTS

| | | | |
|---|---|---|---|
| 2561871 | 10/1985 | France | 43/42.06 |
| 1465276 | 2/1977 | United Kingdom | 43/42.06 |
| 8707476 | 12/1987 | WIPO | 43/42.06 |

*Primary Examiner*—Joseph J. Hail, III
*Attorney, Agent, or Firm*—Roy, Kiesel & Tucker

[57] ABSTRACT

A fishing lure for largemouth bass and other fishes within the family Centrarchidae is described. The lure comprises a body member having incorporated therein a sufficient quantity of an agent in a manner such that the lure will emit effective concentrations of the agent when said lure is within the mouth of the fish. The agent comprises, L-arginine and L-lysine individually, any combinations or mixtures of L-arginine and L-lysine, any mixtures or combinations containing L-arginine and/or L-lysine, and any compounds and/or mixtures of compounds which, in combination with water, will release L-arginine and/or L-lysine.

19 Claims, 5 Drawing Sheets

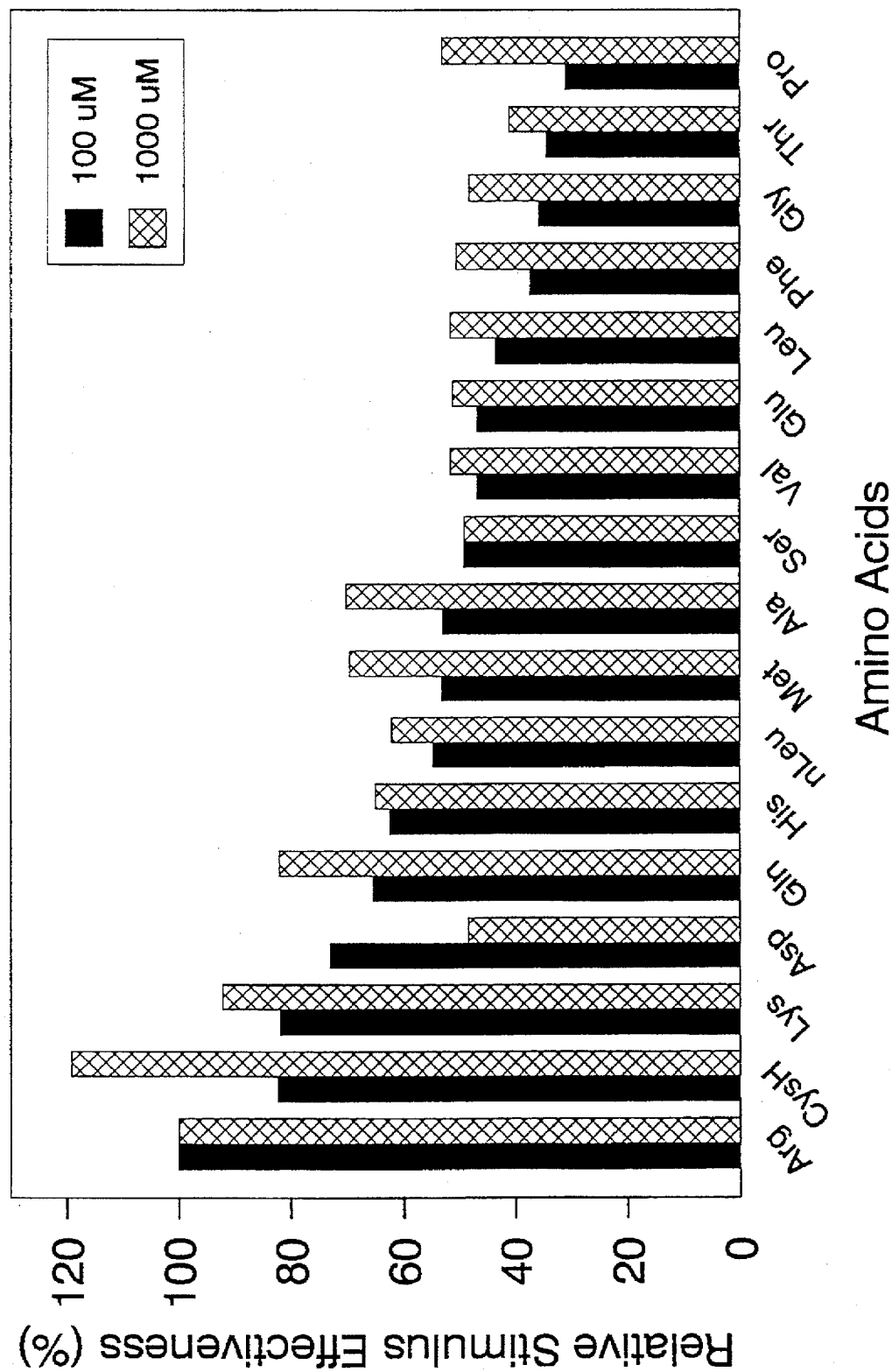

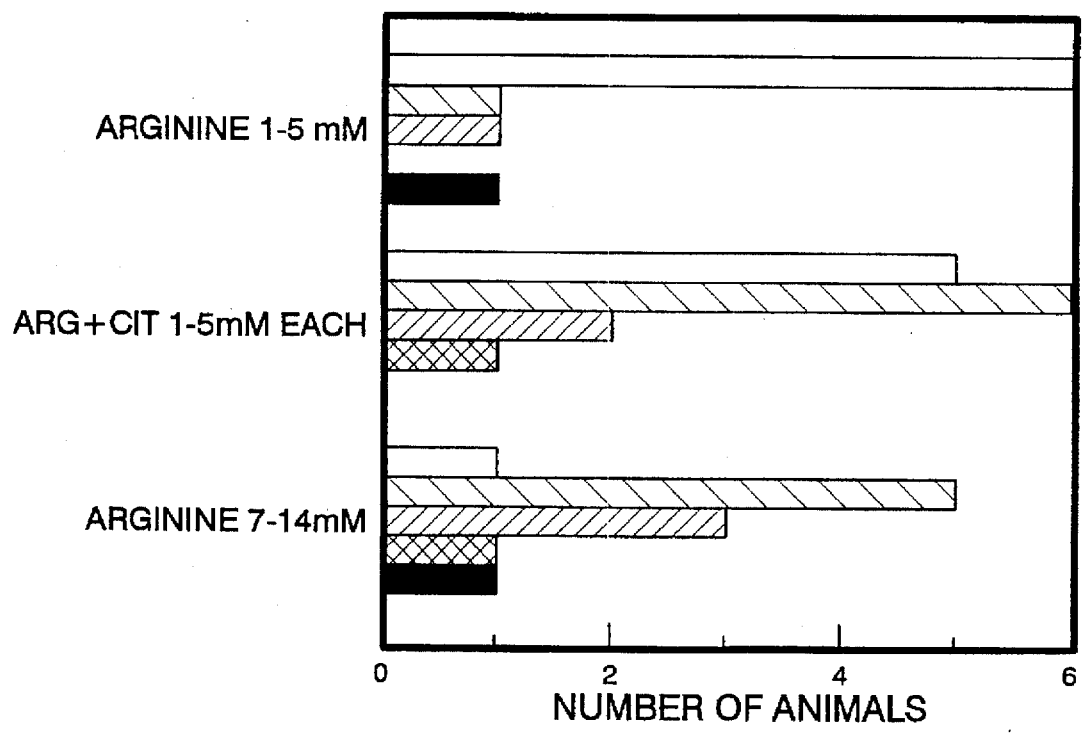
Figure 5: Involuntary biting responses to chemical stimuli

# 5,664,362

FISHING LURE WHICH RELEASES THE INVOLUNTARY BITING REFLEX OF LARGEMOUTH BASS AND OTHER FISHES WITHIN THE FAMILY CENTRACHIDAE

This is a continuation of application Ser. No. 08/117,583, filed on Sep. 3, 1993 now abandoned.

FIELD OF THE INVENTION

This invention relates generally to fishing lures; and, more particularly to fishing lures for largemouth bass (*Micropterus salmoides*) and other fishes within the family Centrarchidae which, in addition to visual, vibrational and tactile performance, chemically release the involuntary biting reflex of the fish when the lure is within the mouth of the fish.

PRIOR ART

The feeding behavior of the largemouth bass and other fishes within the family Centrarchidae consists of two phases: (1) an appetitive phase which includes the food search response when the fish responds to various stimuli to locate food, and (2) a consummatory phase which includes striking, taking the food into the mouth, biting, masticating, and swallowing the prey. Visual, vibrational, acoustic, tactile, olfactory and taste stimuli are all used by largemouth bass in the process of capturing and ingesting its prey. The readiness for food searching behavior in largemouth bass is usually initiated by endogenous rhythms of activity. During this state of increased readiness to respond to feeding stimuli, external visual, vibrational and chemical stimuli can release feeding behavior. Visual, vibrational and chemical stimuli alert the largemouth bass, whereas the visual stimuli guide the fish to chase and strike at its prey.

During the consummatory phase of feeding behavior, visual stimuli guide the intake of either the prey animal or lure offered by the fisherman. The further manipulation of food within the mouth, i.e. biting and mastication, depends on tactile and chemical properties of the prey item. Many fish species chew and masticate soft prey items if the prey items do not have repelling properties. Any repelling property would cause the largemouth bass to reject or expel an item taken into the mouth. To overcome the possibility of rejecting the lure, incorporation of an agent within a lure which releases the involuntary biting reflex would be of value to sport fisherman.

Largemouth bass and other fishes within the family Centrarchidae are predatory fish whose feeding behavior is in most instances released visually. In a typical feeding situation, the bass first sees a possible prey item. The bass then approaches the item. If the item is recognized as possible prey, the bass rapidly approaches to within striking distance and strikes at the item by rapidly sucking water containing the prey item into its mouth. Once the prey item is in the mouth, the bass uses its oral senses of touch and taste to determine whether to chew, swallow or to expel the item. It is during this identification period that the angler has the opportunity to hook the fish.

Some lures take advantage of this characteristic feeding behavior by incorporating multiple treble hooks into the fishing lure. Although the use of multiple hooks is an effective way of exploiting the largemouth bass' rapid striking and expelling behavior, fishing lures having multiple hooks have drawbacks. The principle drawback is that the increased number of hooks increases the likelihood that one of the hooks will become snagged, i.e. impaled within debris in the water.

Since largemouth bass are found in various types of cover conditions, the multiple hook approach will work when the bass are in deep water or in grassy bottomed shoals. However, the multiple hook approach is difficult and often impossible to use when the bass are holed up in heavy protective cover along the bank or within submerged structures such as fallen trees in deeper water. A further disadvantage of using multiple hooks is the additional damage done to those fish which are initially hooked but escape.

When visually stimulated by the appearance of a prey item, in nature the bass will dart from its cover and strike at the prey. Typically, in order to visually stimulate the bass into striking at a lure, the lure must be presented to the bass within or very close to this protective cover. Because of the high likelihood of accidentally hooking the structures of the cover, the multiple hook approach must be abandoned as impractical when fishing this type of structure.

Soft plastic lures are often used when fishing for bass under these conditions. Most notable of this type of lure is the plastic worm. The plastic worm is usually about four to six inches long and about as thick as a regular no. 2 pencil. The worm is rigged by passing the barbed portion of a single hook down through the head portion of the worm about an inch or so along the longitudinal axis of the worm. The barbed portion is then directed out through the side surface of the worm. The hook is then rotated about its shank and the barbed end is directed back through the side surface of the worm about a inch down from its point of exit. The barbed end of the hook is pushed through the body of the worm and is positioned just below the surface of the worm on the side opposite the entry location. When the fisherman pulls sharply on the line, the barbed portion pierces the other side of the worm and, hopefully, becomes impaled within the lip or mouth of the striking fish.

A principal advantage of rigging the worm in this manner is that the barb of the hook is covered preventing the hook from becoming accidentally impaled in tree branches or other submerged structures. This allows the angler to present the lure to fish in heavy cover and dense structure without having to frequently replace lures which have become snagged.

The principal problem with this type of lure is caused by the combination of the lure's tactile and taste qualities coupled with the non-exposed barbed portion of the hook. When the bass strikes at this lure, the barbed portion of the hook is shielded by the plastic body of the worm. The largemouth bass, when alert for prey items, will often strike at the lure as it falls from the surface of the water towards the bottom. As the lure falls, the fish (i) sucks the lure into its mouth; (ii) touches and tastes the lure; and, if the sensory properties of the lure are incorrect, (iii) quickly expels it. The angler, more often than not, is not even aware that a bass has made a strike at the lure since the line is often slack just after the cast has been made. It would, therefore, be of benefit to a fisherman to have a lure that would be detected as a food item and not be expelled from the mouth. Of greater benefit, however, would be a lure which would actually release a biting reflex when within the bass' mouth. The reflexive biting would serve to force the barbed portion of the hook out through the side of the worm and to alert the fisherman that a fish has the lure within its mouth.

There are various sprays and soaking solutions currently available that are supposed to increase the time period during which the bass retains the lure within its mouth. These sprays and solutions purportedly mask the taste of the plastic lure and, thereby, allow the angler an additional time to determine when a strike is in progress and to set the hook. However, none of the currently available sprays and/or solutions actually compel the bass to snap or bite at the lure. What is desired, therefore, is a fishing lure which, upon entering the bass' mouth, will release both involuntary and voluntary biting movements.

SUMMARY OF THE INVENTION

Therefore, it is the object of the present invention to provide a fishing lure for largemouth bass and other fishes within the family Centrarchidae which has incorporated therein an agent that releases the involuntary biting reflex of the fish when the lure is within the mouth of the fish.

Accordingly, a fishing lure comprising a body member having means for eliciting a strike from a bass and which incorporates an agent which releases the involuntary biting reflex of the largemouth bass is described. The agent comprises the amino acids L-arginine and L-lysine either alone or in combination. The amino acid is present in the agent in a sufficient concentration above the physiological and behavioral taste threshold concentrations required to release biting behavior in large mouth bass and other fishes within the family Centrarchidae.

In a preferred embodiment of the present invention, the agent is incorporated into a soft neutral material in sufficient quantities and in a manner to provide concentrations greater than 0.0003 molar of the agent around the lure.

In another preferred embodiment of the invention, the agent in crystalline form, is incorporated into a plastisol mass in sufficient quantities to provide an effective concentration of the agent around the plastisol mass when in use.

DESCRIPTION OF THE DRAWINGS

FIG. 4 is a graphic representation of the results obtained in an example study, conducted by the inventors, showing olfactory responses of *Micropterus salmoides* (largemouth bass) to various chemical stimuli presented at 0.001 and 0.0001 molar concentrations.

FIG. 5 shows that L-arginine and a mixture of L-arginine and trisodium citrate ions release reflexive biting movements.

PREFERRED EMBODIMENT OF THE INVENTION

Figure 1:
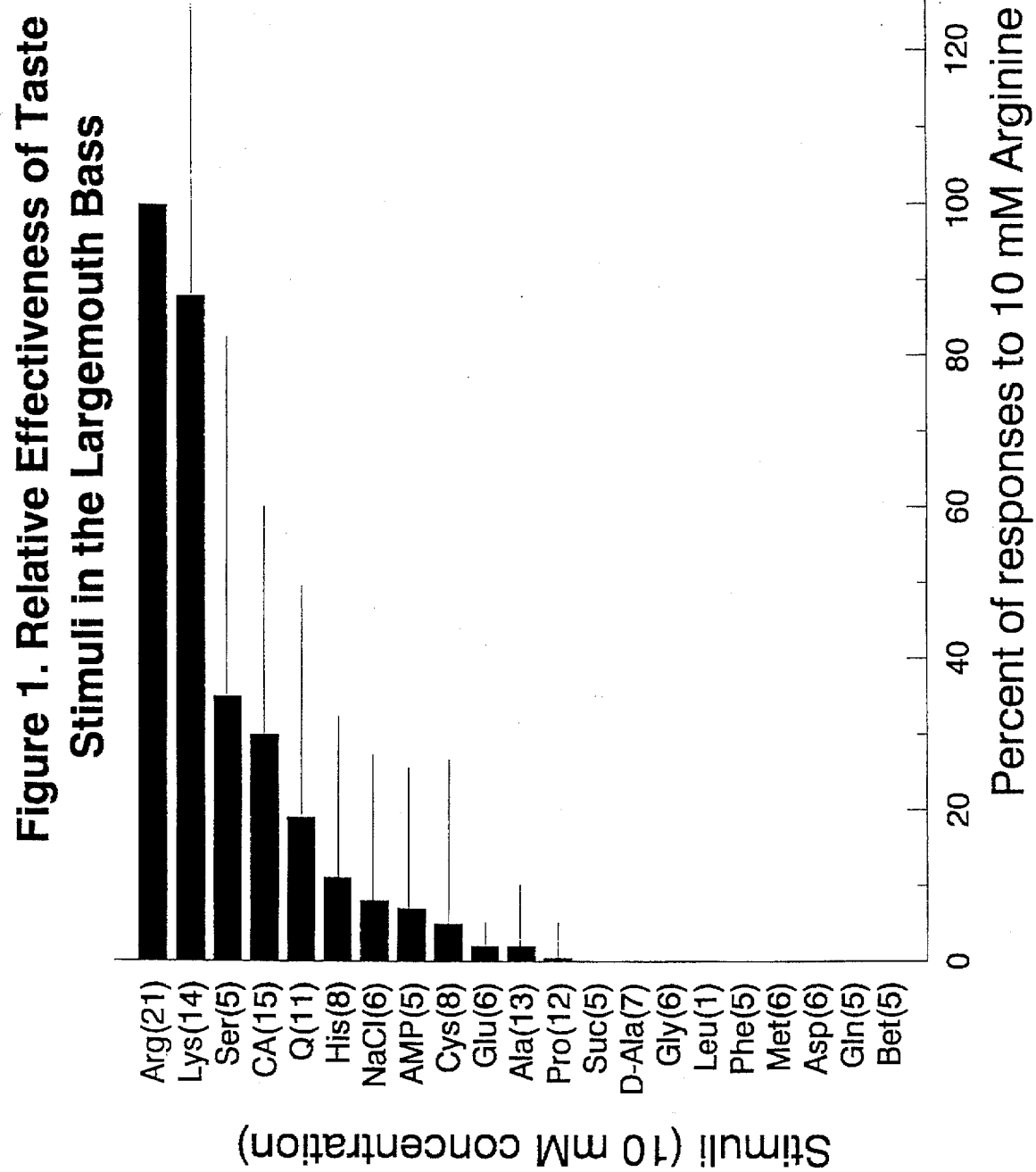
FIGS. 1–3 are graphic representations of the results obtained in an example study, conducted by the inventors, showing taste responses of the glossopharyngeal nerve of *Micropterus salmoides* (largemouth bass) to various chemical stimuli presented at 0.01 molar concentration.

FIG. 1 shows the relative effectiveness of taste stimuli in the largemouth bass in the example study conducted by the inventors. The results are standardized (response to Arg= 100) and depict integrated taste responses (Mean+Standard Deviation), recorded from the glossopharyngeal nerve. The numbers in parentheses indicate the number of tests. The following stimuli were used in the study (in order of presentation): Arg, L-arginine; Lys, L-lysine; Ser, L-serine; CA, citrate ions from trisodium citrate; Q, quinine hydrochloride; His, L-histidine; NaCl, sodium chloride; AMP, adenosine 5'-monophosphate; Cys, L-cysteine; Glu, L-glutamate; Ala, L-alanine; Pro, L-proline; Suc, sucrose; D-Ala, D-alanine; Gly, glycine; Leu, leucine; Phe, phenylalanine; Met, L-methionine; Asp, L-aspartic acid; Gln, L-glutamine; Bet, glycine betaine.

Figure 2:
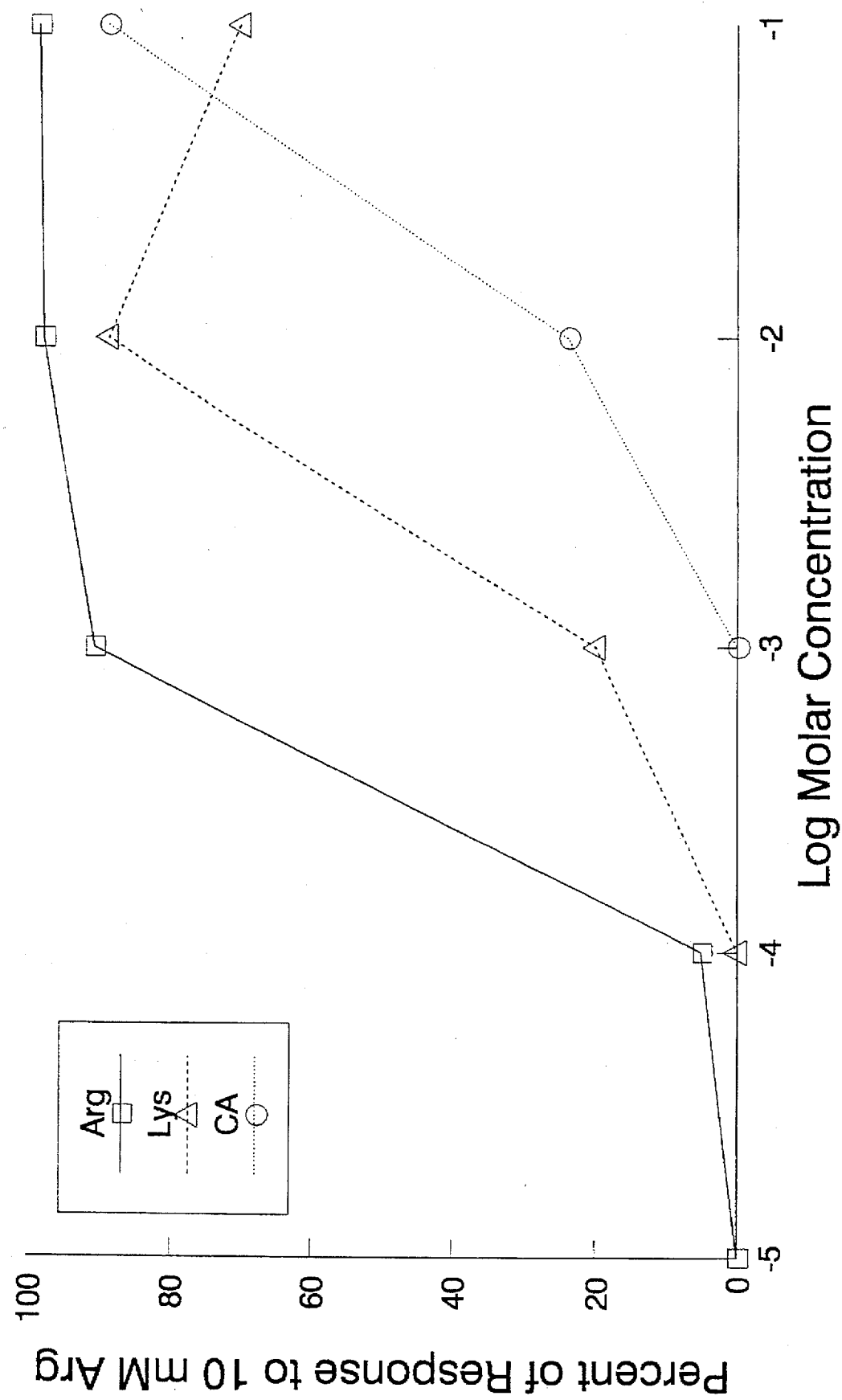

FIG. 2 shows the Dose-Response Relationship of Taste Stimuli. The figure depicts the representative standardized (taste response to 10 mM L-arginine=100) relationship between stimulus concentration and the integrated taste responses of the largemouth bass to L-arginine (Arg), L-lysine (Lys) and citrate ions from trisodium citrate (CA). As illustrated in FIG. 2, largemouth bass (*Micropterus salmoides*) have been found to be responsive to L-arginine or L-lysine at concentrations at or above 0.1 millimolar at the taste receptors located within the oropharyngeal cavity of the fish. The response to L-arginine was found to increase substantially between 0.1 millimolar and 1.0 millimolar. The increase in responsiveness to l-lysine was less pronounced between 0.1 and 1.0 millimolar; however, a substantial increase was noted between 1.0 and 10.0 millimolar. Given the increase in responsiveness detected between 0.1 millimolar and 1.0 millimolar, a positive response to both chemicals is expected at concentrations of about 0.3 millimolar.

Figure 3:
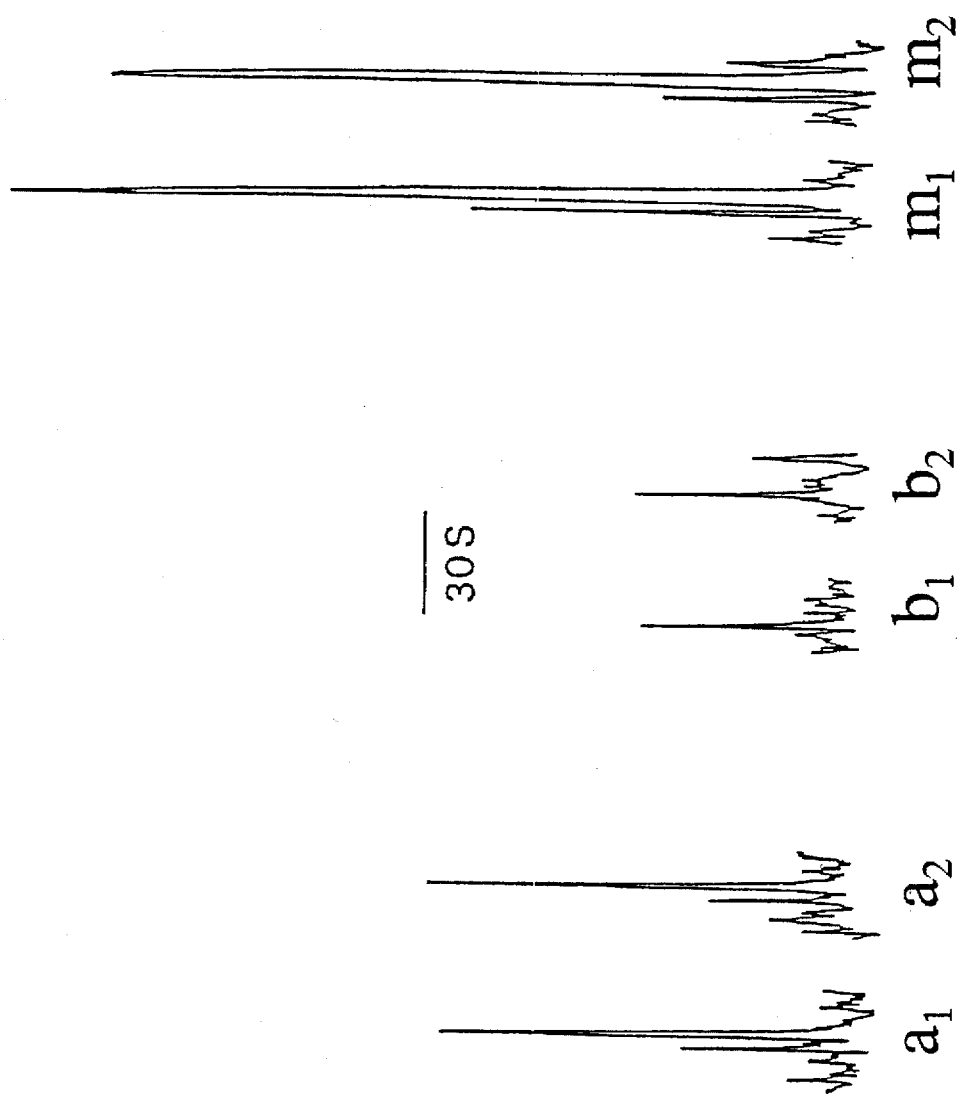

FIG. 3 graphically illustrates the enhanced (synergistic), taste activity of a largemouth bass to a mixture of L-arginine and trisodium citrate, a compound which releases citrate ions when immersed in water. The figure shows the representative integrated taste activity of the largemouth bass to paired stimulation with 0.3 mM L-arginine ($a_1$, $a_2$), 1.0 mM trisodium citrate ($b_1$, $b_2$) and to the binary mixture comprising L-arginine and trisodium citrate (each at the same concentration in the mixture as tested singly).

FIG. 4 graphically illustrates the relative effectiveness of olfactory stimuli in the largemouth bass in the form of standardized (response to Arg=100) electro-olfactogram responses to amino acids. L-arginine and L-lysine, the most effective stimuli tested for the taste system of the largemouth bass (see FIG. 1) are also highly stimulatory olfactory stimuli for the largemouth bass. Abbreviations: nLeu, L-norleucine; val, L-norvaline; thr, L-threonine; see FIG. 1 legend for additional abbreviations.

FIG. 5 graphically illustrates the involuntary biting responses of largemouth bass to solutions of L-arginine and the mixture of L-arginine and citrate ions from trisodium citrate (CIT). Involuntary biting responses to these stimuli occurred whenever the bass were not scared (showing escape behavior). The range of stimulus concentrations reported are the highest possible concentrations of L-arginine and citrate ions measured in stimulus eddies within proximity of the bass in the test aquaria.

It has been discovered, by the inventors hereof, that the involuntary biting reflex of largemouth bass can be released by effective concentrations of L-arginine and L-lysine. It has also been discovered that combinations of L-arginine and L-lysine, in effective concentrations, can also release the involuntary biting reflex of the largemouth bass. It is believed by the inventor's hereof, that because of physiological similarities of fishes within the same family, that other fishes within the family Centrarchidae are similarly affected. The word "agent" is used herein to refer to a substance comprising the amino acids L-arginine and L-lysine, either alone or in combination.

As shown in FIGS. 3 and 5, it has also been discovered by the inventors hereof that the combination of citrate ions with the agent has a synergistic effect on the involuntary biting response and taste response of the glossopharyngeal nerve of largemouth bass. As shown in FIG. 5 the addition of citrate ions (in this test from trisodium citrate) increased the number of involuntary biting responses elicited by L-arginine. FIG. 3 shows the taste responses of the glossopharyngeal nerve of the largemouth bass to concentrations of L-arginine ($a_1$, $a_2$) and trisodium citrate ($b_1$, $b_2$) individually and in a binary mixture ($m_1$, $m_2$) comprising L-arginine and trisodium citrate, each at the same concentration as tested individually. It is desirable, therefore, to include in the agent a quantity of any compound, such as citric acid, trisodium citrate or any other citrate salt, which releases citrate ions when in contact with water in concentrations of about 1 millimolar or greater.

The present invention also provides a lure containing a sufficient quantity of the amino acid in the agent to provide suprathreshold concentrations of the amino acid around the lure in order to release involuntary biting activity when the lure is within the mouth of a fish. As used herein, the term "sufficient quantity" means: any quantity of the amino acid in the agent which, when incorporated into the body of a lure, regardless of the manner of incorporation or release of the agent from the body of the lure, will provide a concentration of the amino acid, when the lure is within the mouth of the fish, which triggers or releases the biting reflex of the fish.

It is further contemplated by the present invention that the agent may be incorporated into the lure in any form, i.e. solid or solution, by any method or in any manner, well known in the art, which will allow the agent to combine with the water surrounding the lure, when in use, to form eddies, clouds or regions having an effective concentration of the agent. As used herein the term "effective concentration" means: any concentration of the amino acid which triggers or releases the biting reflex of the fish. The term "means for creating the effective concentration" is intended to include both the solid and solution forms, or any other forms known in the art, of creating the effective concentrations in still water immediately adjacent to the lure when the lure is immersed in still water.

In a preferred embodiment of the fishing lure of the present invention a sufficient quantity of the agent is incorporated into the lure by placing the agent, in the form of a solid mass, within a cavity contained within the body of the lure. The lure includes a plurality of apertures, having diameters smaller than the solid agent, that connect the cavity to the outer surface of the lure. These apertures allow water to enter the cavity, dissolve the agent and then exit the cavity in effective concentrations.

In another preferred embodiment the fishing lure is constructed of a material, such as a sponge or hydrogel, capable of absorbing or holding a solution comprising a sufficient quantity of the agent. In this preferred embodiment a saturated solution of the agent and water is used. The material can then be made visually stimulating to the largemouth bass by any of the methods and devices well known to those skilled in the art such as shaping, coloring and/or adding glitter etc. Mechanical contact with the lure, allows the agent to form effective concentrations around the lure when in use.

In another preferred embodiment the lure contains the agent, in the form of crystals, which may be incorporated into a plastisol mass formed into the shape of a worm.

In use, the largemouth bass will see and strike at the fishing lure of the present invention by rapidly approaching and sucking a quantity of water surrounding and containing the lure into its mouth, a cavity having a volume of about ¼ to about ½ liter. The agent in solution with the water within the fish's mouth will release reflexive biting.

In addition to providing additional time to allow the angler to set the hook, the reflexive biting signals the angler that a fish is currently striking the lure. This increases both angling fun and the number of fish actually hooked and landed.

It is also to be understood that the agent which is described herein could also be used in any other application where it is desired to release the biting reflex of a largemouth bass, such as in fish feed, or in bait for fish traps.

There are of course other alternate embodiments which are obvious from the foregoing descriptions of the invention which are intended to be included within the scope of the invention as defined by the following claims.

What is claimed is:

1. A fishing lure for largemouth bass and other fishes within the family Centrarchidae comprising:
   a body member; and
   an agent incorporated in said body member, said agent comprising an amino acid selected from the group consisting of L-lysine, L-arginine, and mixtures of L-lysine and L-arginine wherein said agent is present in sufficient amount to create a concentration of said agent of at least about 0.1 millimolar within the interior of the oropharyngeal cavity of said largemouth bass or other member of said family Centrarchidae and in sufficient amount to elicit the involuntary biting reflex of said largemouth bass or other member of said family Centrarchidae.

2. A fishing lure of claim 1 wherein said concentration is at least about 0.3 millimolar.

3. A fishing lure of claim 1 wherein said concentration is at least about 1 millimolar.

4. A fishing lure for largemouth bass and other fishes within the family Centrarchidae comprising:
   a body member; and
   an agent incorporated in said body member, said agent consisting essentially of an amino acid selected from the group consisting or L-lysine, L-arginine, and mixtures of L-lysine and L-arginine.

5. A lure according to claim 4 wherein said agent is present in sufficient amount to create a concentration of said agent of at least about 0.1 millimolar within the interior of the oropharyngeal cavity of said largemouth bass or other member of said family Centrarchidae.

6. A lure according to claim 4 wherein said agent is present in sufficient amount to create a concentration of said agent of at least about 0.3 millimolar within the interior of oropharyngeal cavity of said largemouth bass or other member of said family Centrarchidae.

7. A lure according to claim 4 wherein said agent is present in sufficient amount to create a concentration of said agent of at least about 1 millimolar within the interior of the oropharyngeal cavity of said largemouth bass or other member of said family Centrarchidae.

8. A lure according to claim 4 wherein said agent is present in sufficient amount to elicit the involuntary biting reflex of said largemouth bass or other member of said family Centrarchidae.

9. A fishing lure for largemouth bass and other fishes within the family Centrarchidae comprising:
   a body member; and
   an agent incorporated in said body member, said agent consisting of an amino acid selected from the group consisting of L-lysine, L-arginine, and mixtures of L-lysine and L-arginine.

10. A lure according to claim 9 wherein said agent is present in sufficient amount to create a concentration of said agent of at least about 0.1 millimolar within the interior of the oropharyngeal cavity of said largemouth bass or other member of said family Centrarchidae.

11. A lure according to claim 9 wherein said agent is present in sufficient amount to create a concentration of said agent of at least about 0.3 millimolar within the interior of the oropharyngeal cavity of said largemouth bass or other member of said family Centrarchidae.

12. A lure according to claim 9 wherein said agent is present in sufficient amount to create a concentration of said agent of at least about 1 millimolar within the interior of the oropharyngeal cavity of said largemouth bass or other member of said family Centrarchidae.

13. A lure according to claim 9 wherein said agent is present in sufficient amount to elicit the involuntary biting reflex of said largemouth bass or other member of said family Centrarchidae.

14. A fishing lure for largemouth bass and other fishes within the family Centrarchidae comprising:

a body member; and an agent incorporated in said body member, said agent comprising:
- a compound which will release citrate ions when released in water; and
- an amino acid selected from the group consisting of L-lysine, L-arginine, and mixtures of L-lysine and L-arginine.

15. A lure according to claim 14 wherein said agent is present in sufficient amount to create a concentration of said agent of at least about 0.1 millimolar within the interior of the oropharyngeal cavity of said largemouth bass or other member of said family Centrarchidae.

16. A lure according to claim 14 wherein said agent is present in sufficient amount to create a concentration of said agent of at least about 0.3 millimolar within the interior of the oropharyngeal cavity of said largemouth bass or other member of said family Centrarchidae.

17. A lure according to claim 14 wherein said agent is present in sufficient amount to create a concentration of said agent of at least about 1 millimolar within the interior of the oropharyngeal cavity of said largemouth bass or other member of said family Centrarchidae.

18. A lure according to claim 14 wherein said agent is present in sufficient amount to elicit the involuntary biting reflex of said largemouth bass or other member of said family Centrarchidae.

19. A fishing lure according to claims 1, 4, 9, or 14 wherein said body member is comprised of plastisol.

* * * * *